(12) United States Patent  (10) Patent No.: US 7,793,480 B2
Gembala  (45) Date of Patent: Sep. 14, 2010

(54) MODIFIED BASE PLY ROOF MEMBRANE SET IN FORMULATED CONCRETE SLURRY OVER LIGHTWEIGHT CONCRETE

(76) Inventor: Henry Gembala, 6751 N. Federal Hwy., Ste #302, Boca Raton, FL (US) 33487

( * ) Notice: Subject to any disclaimer, the term of this patent is extended or adjusted under 35 U.S.C. 154(b) by 192 days.

(21) Appl. No.: 11/983,564

(22) Filed: Nov. 9, 2007

(65) Prior Publication Data

US 2008/0127605 A1 Jun. 5, 2008

Related U.S. Application Data

(60) Provisional application No. 60/858,319, filed on Nov. 10, 2006.

(51) Int. Cl.
*E04B 1/16* (2006.01)
*E04B 7/00* (2006.01)
(52) U.S. Cl. .......... 52/409; 52/411; 52/746.11
(58) Field of Classification Search .......... 52/409, 52/411, 449, 405.1, 741.41, 745.06, 746.11
See application file for complete search history.

(56) References Cited

U.S. PATENT DOCUMENTS

| 122,296 | A | * | 12/1871 | Westermayr | 52/745.06 |
|---|---|---|---|---|---|
| 124,192 | A | * | 3/1872 | Bailey | 52/745.06 |
| 1,823,987 | A | * | 9/1931 | Reel | 52/746.11 |
| 2,280,579 | A | * | 4/1942 | Hardy | 52/418 |
| 3,619,961 | A | * | 11/1971 | Sterrett et al. | 52/302.1 |
| 3,884,009 | A | * | 5/1975 | Frohlich et al. | 52/745.06 |
| 4,114,335 | A | * | 9/1978 | Carroll | 52/336 |
| 4,120,131 | A | * | 10/1978 | Carroll | 52/310 |
| 4,507,901 | A | * | 4/1985 | Carroll | 52/302.3 |
| 4,559,263 | A | * | 12/1985 | Roodvoets | 428/312.4 |
| 4,996,812 | A | * | 3/1991 | Venable | 52/408 |
| 6,110,270 | A | * | 8/2000 | Beckenhauer | 106/724 |
| 6,256,957 | B1 | * | 7/2001 | Kelly | 52/413 |
| 6,769,215 | B1 | * | 8/2004 | Carkner | 52/411 |
| 6,881,256 | B2 | * | 4/2005 | Orange et al. | 106/644 |
| 2005/0195681 | A1 | * | 9/2005 | Gembala | 366/46 |
| 2006/0013062 | A1 | * | 1/2006 | Gembala | 366/101 |
| 2007/0130864 | A1 | * | 6/2007 | Semmens et al. | 52/408 |

* cited by examiner

*Primary Examiner*—Brian E Glessner
(74) *Attorney, Agent, or Firm*—Robert M. Downey, P.A.

(57) ABSTRACT

A slurry coat of formulated concrete is applied to a new or existing top coat of lightweight insulating concrete to repair cracks and holes and attach a base ply roof membrane, thereby eliminating the need for a base sheet and mechanical fasteners when installing a roof membrane system on the lightweight concrete deck of a roof structure. The formulated concrete slurry comprises a mixture of Portland cement (type I), cellulose, poly vinyl alcohol, and water. A base ply (modified or single ply) roof membrane having a sanded or fleece bottom side is set into a ¼ inch thick slurry coat of the formulated concrete to effectively attach the base ply roof membrane to the lightweight concrete deck.

9 Claims, 1 Drawing Sheet

MODIFIED BASE PLY ROOF MEMBRANE SET IN FORMULATED CONCRETE SLURRY OVER LIGHTWEIGHT CONCRETE

This non-provisional patent application is based on provisional patent application Ser. No. 60/858,319 filed on Nov. 10, 2006.

BACKGROUND OF THE INVENTION

1. Field of the Invention

The present invention relates to roofing systems, and, more particularly, to a formulated concrete slurry coat for eliminating the need of a base sheet roof membrane and mechanical fasteners in the installation of a roof membrane system to an underlying lightweight concrete deck on a roof structure.

2. Description of the Related Art

Generally, roof systems that use lightweight concrete, with or without insulation, require a base sheet membrane to be mechanically installed to the lightweight concrete for the purpose of allowing moisture to migrate. Once the base sheet is mechanically attached to the lightweight concrete, additional layers of roofing membrane are attached to the base sheet. The additional layers of roofing membrane may be attached by self adhesion, heat welding, or cold adhesive in order to bond the membranes together as a membrane system. Despite the widespread use of the mechanically attached base sheet membrane (using mechanical fasteners) in low sloped roof systems, there are significant drawbacks associated with its use. The increased amount of fasteners installed in order to meet the wind uplift requirements actually damages the lightweight concrete, particularly at the corners and perimeter of the roof. This can lead to roof deck failure. Furthermore, the use of mechanical fasteners damages the underlying concrete deck. More particularly, when the roof membrane system needs to be replaced, the existing roof membrane system must be removed, along with the base sheet and mechanical fasteners. Removing the mechanical fasteners results in the creation of large holes that are left in the lightweight concrete deck. When the new base sheet membrane is installed, new mechanical fasteners penetrate new areas of the existing lightweight concrete and, consequently further damage is caused to the lightweight concrete deck. While the use of lightweight concrete in lieu of insulation has the benefits of providing a slope for the roof system, as well as providing a lasting insulating structure for all future roof systems, the damage caused by mechanical fasteners requires costly and time consuming repairs when reroofing. In view of these shortcomings of the traditional mechanically attached base sheet membrane, there exists an urgent need in the roofing industry for an alternative method of installing a roof membrane system to an underlying lightweight insulating concrete deck on a roof structure that preserves the integrity of the lightweight concrete deck, while also reducing the cost of installation of the roof system.

SUMMARY OF THE INVENTION

The present invention is directed to a system and method of installation of a roof membrane system. According to a preferred embodiment of the invention, a slurry coat of formulated concrete is applied to a new or existing top coat of lightweight insulating concrete to repair stress cracks and holes and attach a base ply roof membrane, thereby eliminating the need for a base sheet and mechanical fasteners when installing the roof membrane system on the lightweight concrete deck of a roof structure. The formulated concrete slurry comprises a mixture of Portland cement (type I), cellulose, poly vinyl alcohol, and water. A base ply (modified or single ply) roof membrane having a sanded or fleece bottom side is set into a ¼ inch thick slurry coat of the formulated concrete to effectively attach the base ply roof membrane to the lightweight concrete deck.

OBJECTS AND ADVANTAGES OF THE INVENTION

Considering the foregoing, it is a primary object of the present invention to eliminate the use of a mechanically fastened base sheet roof membrane in the installation of a roof membrane system to a new or existing lightweight concrete deck.

It is a further object of the present invention to provide an improved method of installing a roof membrane system to a lightweight insulating concrete deck which eliminates the need for mechanical fasteners that compromise the integrity of the lightweight concrete.

It is a further object of the present invention to provide an improved method for installing a roof membrane system to a lightweight insulating concrete deck on a roof structure which repairs stress cracks in a new or existing lightweight insulating concrete top coat, while also serving as a means of attachment of a base ply membrane to the new or existing lightweight concrete top coat.

It is still a further object of the present invention to provide an improved method for installing a roof membrane system to a lightweight insulating concrete deck on a roof structure which provides for attachment of a base ply membrane to a new or existing lightweight concrete deck without compromising the structural integrity of the lightweight concrete.

It is still a further object of the present invention to provide a formulated concrete mixture for application as a slurry coat to the top coat of lightweight insulating concrete of a roof structure, and wherein the formulated concrete slurry provides a means of attachment of a base ply membrane to the underlying lightweight concrete deck, while also repairing stress cracks in the new or existing lightweight concrete deck.

It is still a further object of the present invention to provide a formulated concrete mixture for use as a slurry coat to attach a base ply membrane to a lightweight concrete deck of a roof structure without the need of mechanical fasteners, and wherein the formulated concrete slurry repairs stress cracks and holes from previous mechanical fasteners that have been removed from the lightweight concrete.

It is still a further object of the present invention to provide a formulated concrete mixture for use as a slurry coat to affectively attach a base ply membrane to a new or existing lightweight insulating concrete deck of a roof structure, while simultaneously repairing stress cracks or holes all in one application, resulting in substantial cost savings.

These and other objects and advantages of the invention are more readily apparent with reference to the detailed description and accompanying drawings.

BRIEF DESCRIPTION OF THE DRAWINGS

For a fuller understanding of the nature of the present invention, reference should be made to the following detailed description taken in conjunction with the accompanying drawings in which.

DETAILED DESCRIPTION OF THE PREFERRED EMBODIMENT

Figure 1:
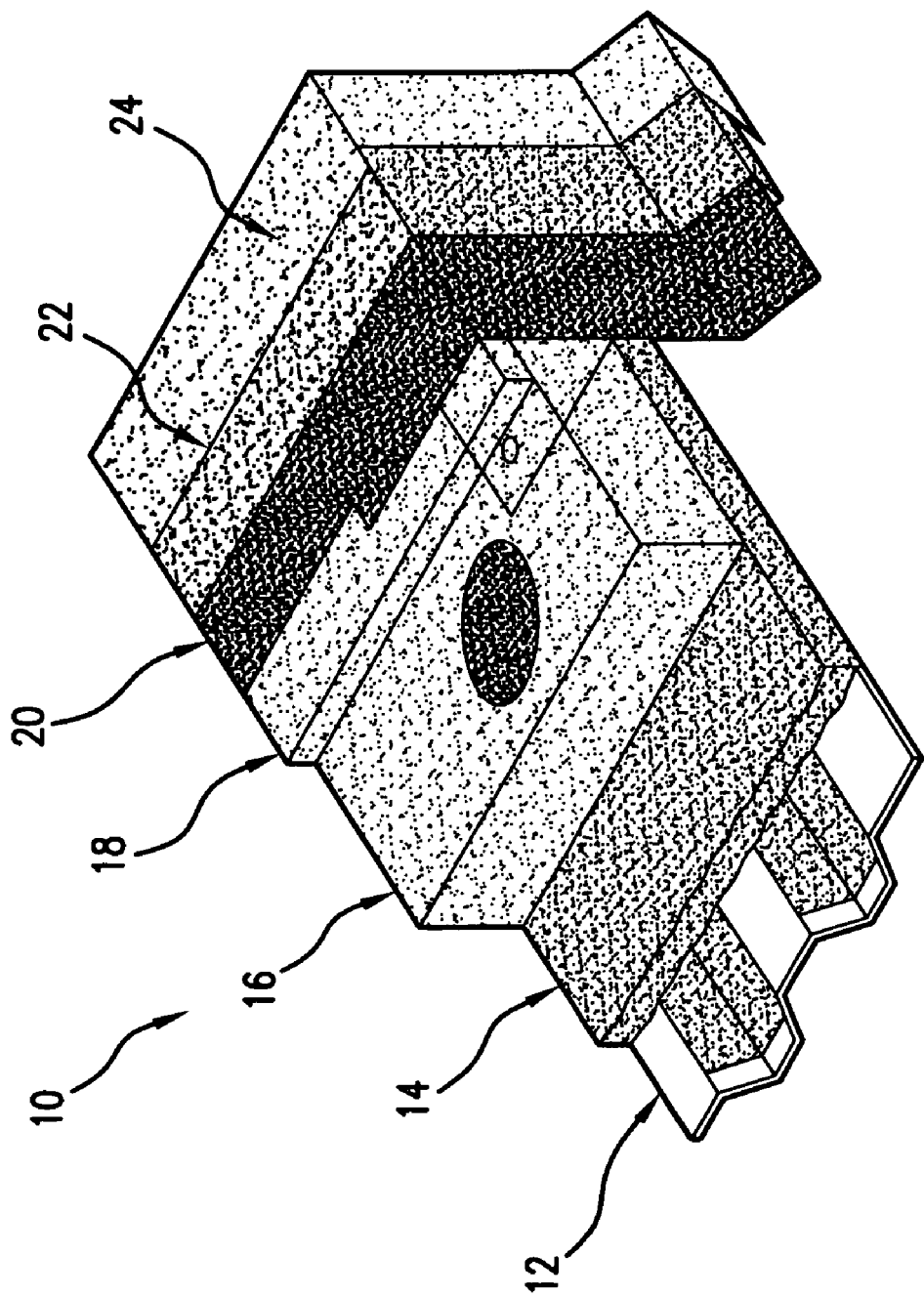
FIG. 1 is an isolated, partial perspective view, shown in cross section, illustrating the structural layers of a roof structure including a lightweight insulating concrete deck with a base ply roof membrane attached to the lightweight insulating concrete top coat using a formulated concrete slurry that eliminates the need of a base sheet and mechanical fasteners.

As shown in FIG. 1, a roof system 10 includes a roof deck 12 a slurry coat of lightweight insulating concrete 14, a layer of EPS (expanded poly styrene) board insulation 16 and a lightweight insulating concrete top coat 18.

A slurry of formulated concrete mixture 20 is applied to the top surface of the lightweight insulating top coat 18 to fill in stress cracks and holes. Immediately after application of the formulated concrete slurry 20, and before the formulated concrete mixture cures, a single or modified base ply membrane 22 is applied over the formulated concrete slurry 20 to effectively attached the base ply membrane 22 to the lightweight concrete top coat 18. The additional layers of roofing membrane 24 may be attached by self adhesion, heat welding, or cold adhesive in order to bond the membranes together as a membrane system covering the lightweight concrete deck.

While the present invention has been shown and described in accordance with a preferred and practical embodiment thereof, it is recognized that departures from the instant disclosure are contemplated within the spirit and scope of the present invention.

What is claimed is:

1. A roof system comprising:
   a roof deck;
   a first layer of lightweight insulating concrete;
   a layer of board insulation;
   a second layer of lightweight insulating concrete defining a top coat;
   a slurry coat of a concrete composition applied over said top coat for filling in cracks and holes in said top coat, and said concrete composition of said slurry coat comprising:
   portland cement;
   cellulose;
   poly vinyl alcohol; and
   water;
   a base ply membrane attached to said slurry coat during curing of said concrete composition; and
   at least one layer of roofing membrane attached to said base ply membrane.

2. The roof system as recited in claim 1 wherein said slurry coat is less than one inch thick.

3. The roof system as recited in claim 1 wherein said base ply membrane includes a sanded bottom side for bonding attachment with said slurry coat of said concrete composition during curing thereof.

4. The roof system as recited in claim 1 wherein said base ply membrane includes a fleece bottom side for bonding attachment with said slurry coat of said concrete composition during curing thereof.

5. The roof system as recited in claim 1 wherein said board insulation is expanded poly styrene.

6. A method of installing a roof membrane system to a roof structure having a roof deck, at least one layer of lightweight insulating concrete, a layer of board insulation and a top coat layer of lightweight insulating concrete, said method comprising the steps of:
   applying a slurry coat of a concrete composition comprising portland cement, cellulose, poly vinyl alcohol and water over said top coat of lightweight insulating concrete and filling in cracks and holes in said top coat;
   applying a base ply membrane on top of said slurry coat before said concrete composition cures;
   allowing said base ply membrane to become bonded with said slurry coat and said top coat as said slurry coat of said concrete composition cures; and
   subsequently attaching at least one layer of roofing membrane to said base ply membrane.

7. The method as recited in claim 6 wherein said step of subsequently attaching said at least on layer of roofing membrane further comprises the step of:
   attaching said at least one layer of roofing membrane to said base ply membrane by self adhesion.

8. The method as recited in claim 6 wherein said step of subsequently attaching said at least on layer of roofing membrane further comprises the step of:
   attaching said at least one layer of roofing membrane to said base ply membrane by heat welding.

9. The method as recited in claim 6 wherein said step of subsequently attaching said at least on layer of roofing membrane further comprises the step of:
   attaching said at least one layer of roofing membrane to said base ply membrane by cold adhesive.

* * * * *